(12) United States Patent
Tokish et al.

(10) Patent No.: US 10,082,877 B2
(45) Date of Patent: Sep. 25, 2018

(54) ORIENTATION-INDEPENDENT AIR GESTURE DETECTION SERVICE FOR IN-VEHICLE ENVIRONMENTS

(71) Applicant: FORD GLOBAL TECHNOLOGIES, LLC, Dearborn, MI (US)

(72) Inventors: Stephen Ronald Tokish, Sylvania, OH (US); Pietro Buttolo, Dearborn Heights, MI (US); James Stewart Rankin, II, Novi, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/070,129

(22) Filed: Mar. 15, 2016

(65) Prior Publication Data
US 2017/0269695 A1 Sep. 21, 2017

(51) Int. Cl.
 G06F 3/01 (2006.01)
 G06F 3/0346 (2013.01)
 G06F 3/038 (2013.01)
(52) U.S. Cl.
 CPC .............. *G06F 3/017* (2013.01); *G06F 3/016* (2013.01); *G06F 3/038* (2013.01); *G06F 3/0346* (2013.01)
(58) Field of Classification Search
 None
 See application file for complete search history.

(56) References Cited

U.S. PATENT DOCUMENTS 4,721,954 A   1/1988 Mauch
4,792,783 A   12/1988 Burgess et al.
(Continued)

FOREIGN PATENT DOCUMENTS

CN   102445954 B   3/2014
CN   103942963 A   7/2014
(Continued)

OTHER PUBLICATIONS

General Motors Corporation; Pontiac GTO Owner's Manual; 2005; pp. 3-19 and 3-20; https://my.gm.com/content/dam/gmownercenter/gmna/dynamic/manuals/2006/pontiac/gto/2006_gto_owners.pdf
(Continued)

*Primary Examiner* — Matthew Yeung
(74) *Attorney, Agent, or Firm* — Jennifer M. Stec; Brooks Kushman P.C.

(57) ABSTRACT

A vehicle sensor may indicate heading angle. A plurality of seating zones may each include an orientation sensor indicating seating angle. A component within one of the seating zones may provide interface information descriptive of commands and associated air gestures oriented to the one seating zone, and perform one of the commands responsive to a personal device detecting the corresponding air gesture, accounting for the heading angle and seating angle. Gesture input from a personal device may be adjusted to create acceleration data in a reference frame of an in-vehicle component in a seating zone using orientation of the device, vehicle heading relative to magnetic North, and orientation angle for the seating zone including the device. When the acceleration data matches an air gesture in a library of air gestures, a command may be sent to the component corresponding to the matching air gesture.

19 Claims, 8 Drawing Sheets

(56) References Cited

U.S. PATENT DOCUMENTS

| | | | |
|---|---|---|---|
| 4,962,302 A | 10/1990 | Katsumi | |
| 5,132,880 A | 7/1992 | Kawamura | |
| 5,143,437 A | 9/1992 | Matsuno et al. | |
| 5,255,442 A * | 10/1993 | Schierbeek | B60K 35/00 324/252 |
| 5,543,591 A | 8/1996 | Gillespie et al. | |
| 5,648,656 A | 7/1997 | Begemann et al. | |
| 5,650,929 A | 7/1997 | Potter et al. | |
| 5,697,844 A | 12/1997 | Von Kohorn | |
| 5,757,268 A | 5/1998 | Toffolo et al. | |
| 5,796,179 A | 8/1998 | Honaga | |
| 5,848,634 A | 12/1998 | Will et al. | |
| 5,850,174 A | 12/1998 | DiCroce et al. | |
| 6,028,537 A | 2/2000 | Suman et al. | |
| 6,377,860 B1 | 4/2002 | Gray et al. | |
| 6,397,249 B1 | 5/2002 | Cromer et al. | |
| 6,449,541 B1 | 9/2002 | Goldberg et al. | |
| 6,473,038 B2 | 10/2002 | Patwari et al. | |
| 6,536,928 B1 | 3/2003 | Hein et al. | |
| 6,935,763 B2 | 8/2005 | Mueller et al. | |
| 7,009,504 B1 | 3/2006 | Banter et al. | |
| 7,015,791 B2 | 3/2006 | Huntzicker | |
| 7,015,896 B2 | 3/2006 | Levy et al. | |
| 7,034,655 B2 | 4/2006 | Magner et al. | |
| 7,342,325 B2 | 3/2008 | Rhodes | |
| 7,502,620 B2 | 3/2009 | Morgan et al. | |
| 7,595,718 B2 | 9/2009 | Chen | |
| 7,672,757 B2 | 3/2010 | Hong et al. | |
| 7,706,740 B2 | 4/2010 | Collins et al. | |
| 7,778,651 B2 | 8/2010 | Billhartz | |
| 7,800,483 B2 | 9/2010 | Bucher | |
| 7,810,969 B2 | 10/2010 | Blackmore et al. | |
| 7,973,773 B2 | 7/2011 | Pryor | |
| 8,065,169 B1 | 11/2011 | Oldham et al. | |
| 8,073,589 B2 | 12/2011 | Rasin et al. | |
| 8,324,910 B2 | 12/2012 | Lamborghini et al. | |
| 8,344,850 B2 | 1/2013 | Girard, III et al. | |
| 8,408,766 B2 | 4/2013 | Wilson et al. | |
| 8,417,258 B2 | 4/2013 | Barnes, Jr. | |
| 8,421,589 B2 | 4/2013 | Sultan et al. | |
| 8,447,598 B2 | 5/2013 | Chutorash et al. | |
| 8,476,832 B2 | 7/2013 | Prodin et al. | |
| 8,482,430 B2 | 7/2013 | Szczerba | |
| 8,768,565 B2 | 7/2014 | Jefferies et al. | |
| 8,797,295 B2 | 8/2014 | Bernstein et al. | |
| 8,823,517 B2 | 9/2014 | Hadsall, Sr. | |
| 8,831,514 B2 | 9/2014 | Tysowski | |
| 8,856,543 B2 | 10/2014 | Geiger et al. | |
| 8,866,604 B2 | 10/2014 | Rankin et al. | |
| 8,873,147 B1 | 10/2014 | Rhodes et al. | |
| 8,873,841 B2 | 10/2014 | Yang et al. | |
| 8,880,100 B2 | 11/2014 | Dobyns | |
| 8,930,045 B2 | 1/2015 | Oman et al. | |
| 8,947,202 B2 | 2/2015 | Tucker et al. | |
| 9,053,516 B2 | 6/2015 | Stempora | |
| 9,078,200 B2 | 7/2015 | Wuergler et al. | |
| 9,104,537 B1 | 8/2015 | Penilla et al. | |
| 9,164,588 B1 * | 10/2015 | Johnson | G06F 3/017 |
| 9,288,270 B1 | 3/2016 | Penilla et al. | |
| 9,350,809 B2 | 5/2016 | Leppanen | |
| 9,357,054 B1 * | 5/2016 | Froment | H04M 1/72577 |
| 9,417,691 B2 | 8/2016 | Belimpasakis et al. | |
| 2002/0069002 A1 | 6/2002 | Morehouse | |
| 2002/0070923 A1 | 6/2002 | Levy et al. | |
| 2002/0087423 A1 | 7/2002 | Carbrey Palango et al. | |
| 2002/0092019 A1 | 7/2002 | Marcus | |
| 2002/0096572 A1 | 7/2002 | Chene et al. | |
| 2002/0178385 A1 | 11/2002 | Dent et al. | |
| 2002/0197976 A1 | 12/2002 | Liu et al. | |
| 2003/0078709 A1 | 4/2003 | Yester et al. | |
| 2003/0171863 A1 | 9/2003 | Plumeier et al. | |
| 2004/0034455 A1 | 2/2004 | Simonds et al. | |
| 2004/0076015 A1 | 4/2004 | Aoki et al. | |
| 2004/0141634 A1 * | 7/2004 | Yamamoto | B60K 37/06 382/104 |
| 2004/0215532 A1 | 10/2004 | Boman et al. | |
| 2005/0040933 A1 | 2/2005 | Huntzicker | |
| 2005/0044906 A1 | 3/2005 | Spielman | |
| 2005/0099320 A1 | 5/2005 | Nath et al. | |
| 2005/0136845 A1 | 6/2005 | Masouka et al. | |
| 2005/0185399 A1 | 8/2005 | Beermann et al. | |
| 2005/0261807 A1 | 11/2005 | Sorensen et al. | |
| 2005/0261815 A1 | 11/2005 | Cowelchuk et al. | |
| 2005/0288837 A1 | 12/2005 | Wiegand et al. | |
| 2006/0075934 A1 | 4/2006 | Ram | |
| 2006/0089755 A1 | 4/2006 | Ampunan et al. | |
| 2006/0155429 A1 | 7/2006 | Boone et al. | |
| 2006/0155547 A1 | 7/2006 | Browne et al. | |
| 2006/0205456 A1 | 9/2006 | Bentz et al. | |
| 2006/0250217 A1 | 11/2006 | Hamling et al. | |
| 2006/0258377 A1 | 11/2006 | Economos et al. | |
| 2006/0271261 A1 | 11/2006 | Flores et al. | |
| 2007/0021885 A1 | 1/2007 | Soehren | |
| 2007/0140187 A1 | 6/2007 | Rokusek et al. | |
| 2007/0180503 A1 | 8/2007 | Li et al. | |
| 2007/0198472 A1 | 8/2007 | Simonds et al. | |
| 2007/0201389 A1 | 8/2007 | Murayama | |
| 2007/0262140 A1 | 11/2007 | Long, Sr. | |
| 2008/0140868 A1 | 6/2008 | Kalayjian et al. | |
| 2008/0180231 A1 | 7/2008 | Chen | |
| 2008/0261643 A1 | 10/2008 | Bauer et al. | |
| 2008/0288406 A1 | 11/2008 | Seguin et al. | |
| 2009/0249081 A1 | 10/2009 | Zayas | |
| 2009/0253439 A1 | 10/2009 | Gantner et al. | |
| 2010/0091394 A1 | 4/2010 | DeWind et al. | |
| 2010/0171696 A1 * | 7/2010 | Wu | G06F 3/017 345/158 |
| 2010/0176917 A1 | 7/2010 | Bacarella | |
| 2010/0197359 A1 | 8/2010 | Harris | |
| 2010/0216401 A1 | 8/2010 | Kitahara | |
| 2010/0222939 A1 | 9/2010 | Namburu et al. | |
| 2010/0225443 A1 | 9/2010 | Bayram et al. | |
| 2010/0231958 A1 | 9/2010 | Okigami | |
| 2010/0233957 A1 | 9/2010 | Dobosz | |
| 2010/0235045 A1 | 9/2010 | Craig et al. | |
| 2010/0280711 A1 | 11/2010 | Chen et al. | |
| 2010/0315373 A1 | 12/2010 | Steinhauser et al. | |
| 2011/0086668 A1 | 4/2011 | Patel | |
| 2011/0137520 A1 | 6/2011 | Rector et al. | |
| 2011/0187496 A1 | 8/2011 | Denison et al. | |
| 2011/0199298 A1 | 8/2011 | Bassompiere et al. | |
| 2011/0219080 A1 | 9/2011 | McWithey et al. | |
| 2011/0264491 A1 | 10/2011 | Birnbaum et al. | |
| 2012/0006611 A1 | 1/2012 | Wallace et al. | |
| 2012/0032899 A1 | 2/2012 | Waeller et al. | |
| 2012/0065815 A1 | 3/2012 | Hess | |
| 2012/0096908 A1 | 4/2012 | Fuse | |
| 2012/0098768 A1 | 4/2012 | Bendewald et al. | |
| 2012/0109451 A1 | 5/2012 | Tan | |
| 2012/0136802 A1 | 5/2012 | McQuade et al. | |
| 2012/0154114 A1 | 6/2012 | Kawamura | |
| 2012/0214463 A1 | 8/2012 | Smith et al. | |
| 2012/0214471 A1 | 8/2012 | Tadayon et al. | |
| 2012/0229253 A1 | 9/2012 | Kolar | |
| 2012/0244883 A1 | 9/2012 | Tibbitts et al. | |
| 2012/0254809 A1 | 10/2012 | Yang et al. | |
| 2012/0268235 A1 | 10/2012 | Farhan et al. | |
| 2012/0268242 A1 | 10/2012 | Tieman et al. | |
| 2013/0015951 A1 | 1/2013 | Kuramochi et al. | |
| 2013/0037252 A1 | 2/2013 | Major et al. | |
| 2013/0079951 A1 | 3/2013 | Brickman | |
| 2013/0099892 A1 | 4/2013 | Tucker et al. | |
| 2013/0116012 A1 | 5/2013 | Okayasu | |
| 2013/0218371 A1 | 8/2013 | Simard et al. | |
| 2013/0227647 A1 | 8/2013 | Thomas et al. | |
| 2013/0259232 A1 | 10/2013 | Petel | |
| 2013/0261871 A1 * | 10/2013 | Hobbs | B60K 37/06 701/28 |
| 2013/0283202 A1 * | 10/2013 | Zhou | G06F 3/017 715/781 |
| 2013/0295908 A1 | 11/2013 | Zeinstra et al. | |
| 2013/0300608 A1 | 11/2013 | Margalef et al. | |
| 2013/0329111 A1 | 12/2013 | Desai et al. | |
| 2013/0335222 A1 | 12/2013 | Comerford et al. | |

(56) References Cited

U.S. PATENT DOCUMENTS

| | | |
|---|---|---|
| 2013/0342379 A1 | 12/2013 | Bauman et al. |
| 2014/0043152 A1 | 2/2014 | Lippman et al. |
| 2014/0068713 A1 | 3/2014 | Nicholson et al. |
| 2014/0121883 A1 | 5/2014 | Shen et al. |
| 2014/0139454 A1 | 5/2014 | Mistry et al. |
| 2014/0142783 A1 | 5/2014 | Grimm et al. |
| 2014/0163774 A1 | 6/2014 | Demeniuk |
| 2014/0164559 A1 | 6/2014 | Demeniuk |
| 2014/0188348 A1 | 7/2014 | Gautama et al. |
| 2014/0200736 A1 | 7/2014 | Silvester |
| 2014/0212002 A1 | 7/2014 | Curcio et al. |
| 2014/0213287 A1 | 7/2014 | MacDonald et al. |
| 2014/0215120 A1 | 7/2014 | Saylor et al. |
| 2014/0226303 A1 | 8/2014 | Pasdar |
| 2014/0258727 A1 | 9/2014 | Schmit et al. |
| 2014/0277935 A1 | 9/2014 | Daman et al. |
| 2014/0279744 A1* | 9/2014 | Evans ............... G06N 99/005 706/12 |
| 2014/0309806 A1 | 10/2014 | Ricci |
| 2014/0309879 A1* | 10/2014 | Ricci ............... H04W 48/04 701/36 |
| 2014/0321321 A1 | 10/2014 | Knaappila |
| 2014/0335902 A1 | 11/2014 | Guba et al. |
| 2014/0375477 A1 | 12/2014 | Jain et al. |
| 2014/0379175 A1 | 12/2014 | Mittermeier |
| 2014/0380442 A1 | 12/2014 | Addepalli et al. |
| 2015/0039877 A1 | 2/2015 | Hall et al. |
| 2015/0048927 A1 | 2/2015 | Simmons |
| 2015/0094088 A1 | 4/2015 | Chen |
| 2015/0116085 A1 | 4/2015 | Juzswik |
| 2015/0116100 A1 | 4/2015 | Yang et al. |
| 2015/0123762 A1 | 5/2015 | Park et al. |
| 2015/0126171 A1 | 5/2015 | Miller et al. |
| 2015/0147974 A1 | 5/2015 | Tucker et al. |
| 2015/0148990 A1 | 5/2015 | Patel |
| 2015/0149042 A1 | 5/2015 | Cooper et al. |
| 2015/0154531 A1 | 6/2015 | Skaaksrud |
| 2015/0172902 A1 | 6/2015 | Kasslin et al. |
| 2015/0178034 A1 | 6/2015 | Penilla et al. |
| 2015/0181014 A1 | 6/2015 | Gerhardt et al. |
| 2015/0204965 A1 | 7/2015 | Magarida et al. |
| 2015/0210287 A1 | 7/2015 | Penilla et al. |
| 2015/0223151 A1 | 8/2015 | Lei et al. |
| 2015/0256668 A1 | 9/2015 | Atkinson et al. |
| 2015/0261219 A1 | 9/2015 | Cuddihy et al. |
| 2015/0261573 A1 | 9/2015 | Rausch et al. |
| 2015/0269797 A1* | 9/2015 | Kauffmann ......... G07C 9/00309 340/5.61 |
| 2015/0278164 A1 | 10/2015 | Kim et al. |
| 2015/0283914 A1 | 10/2015 | Malone |
| 2015/0294518 A1 | 10/2015 | Peplin et al. |
| 2015/0332530 A1 | 11/2015 | Kishita |
| 2015/0352953 A1 | 12/2015 | Koravadi |
| 2015/0356797 A1 | 12/2015 | McBride et al. |
| 2015/0382160 A1 | 12/2015 | Slay, Jr. et al. |
| 2016/0039430 A1 | 2/2016 | Ricci |
| 2016/0055699 A1 | 2/2016 | Vincenti |
| 2016/0119782 A1 | 4/2016 | Kim |
| 2016/0133072 A1 | 5/2016 | Santavicca |
| 2016/0203661 A1 | 7/2016 | Pudar et al. |
| 2016/0214572 A1 | 7/2016 | Snider |
| 2016/0248905 A1 | 8/2016 | Miller et al. |
| 2016/0332535 A1 | 11/2016 | Bradley et al. |
| 2016/0360382 A1 | 12/2016 | Gross et al. |
| 2017/0313426 A1 | 11/2017 | Morin |

FOREIGN PATENT DOCUMENTS

| | | |
|---|---|---|
| JP | 2011131833 A | 7/2011 |
| WO | 2013052043 A1 | 11/2013 |

OTHER PUBLICATIONS

Bargshady et al., Precise Tracking of Things via Hybrid 3-D Fingerprint Database and Kernel Method Particle Filter, 2016, IEEE, p. 8963-8971.

Murugappan et al., Wireless EEG Signals based Neuromarketing System using Fast Fourier Transform (FFT), 2014, IEEE, p. 25-30.

Katoh et al., A Method of Advertisement Selection in Multiple RFID-Tags Sensor Network for a Ubiquitous Wide-Area Advertising Service, 2008, IEEE, p. 519-524.

Rasin, "An In/Vehicle Human/Machine Interface Module," XML Journal, Jan. 3, 2003, (9 pages), retrieved from http://xml.sys/con.com/node/40547 on Dec. 13, 2014.

Shahzada, "Touch Interaction for User Authentication," Thesis, Carleton University, Ottawa, Ontario, May 2014 (124 pages).

Napa Sae/Bae et al., "Biometric/Rich Gestures: A Novel Approach to Authentication on Multi/touch Devices," NYU/Poly, CHI 2012, May 5/10, 2012, Austin, TX (10 pages).

Services/Bluetooth Development Portal, last accessed May 30, 2015, https://developer.bluetooth.org/gatt/services/Pages/ServicesHome.aspx. (1 page).

Azad, "The Quick Guide to GUIDs," Better Explained / Math insights that click, last accessed May 24, 2015, http://betterexplained.com/articles (15 pages).

Goodwin, "Add/on module auto/unlocks your car when your phone is near," CNET, Car Tech, Nov. 19, 2013, http://www.cnet.com/news/add/on/module/auto/unlocks/your/car/when/your/phone/is/near (2 pages).

Hertz 24/7, "Book. Unlock. Go. You can reserve your vehicle anywhere, anytime / up to 10 days in advance," last accessed Jul. 28, 2015, https://www.hertz247.com/parkridge/en/us/About (3 pages).

Klosowski, "Unlock Your Car with a Bluetooth Powered Keyless Entry System," Lifehacker, Sep. 30, 2013, http://lifehacker.com/unlock/your/car/with/a/bluetooth/powered/keyless/entry/1427088798 (2 pages).

Toyota, Toyota Prius C Brochure, 2015, available at http://www.toyota.com/priusc/ebrochure.

Thomas, "2010 Toyota Prius Touch Tracer Display," Mar. 3, 2009, available at https://www.cars.com/articles/2009/03/2010/toyota/prius/touch/tracer/display/.

Gahran, "Vehicle owners manuals // now on smartphones," CNN.com, Jan. 31, 2011, available at http://www.cnn.com/2011/TECH/mobile/01/31/car.manual.phone/.

Specification of the Bluetooth System, Version 4.2, "Master Table of Contents & Compliance Requirements," Dec. 2, 2014, https://www.bluetooth.or/en/us/specification/adopted/specifications. (2,772 pages).

\* cited by examiner

ORIENTATION-INDEPENDENT AIR GESTURE DETECTION SERVICE FOR IN-VEHICLE ENVIRONMENTS

TECHNICAL FIELD

The illustrative embodiments generally relate to an orientation-independent air gesture detection service for use within in-vehicle environments.

BACKGROUND

Air gestures refer to device control features performed by a user making movements through the air. One challenge with implementing air gestures is establishing a proper reference frame relative to the user. While a device such as a phone or wearable may be able to determine the location of magnetic North and the direction of gravity, it is more difficult to determine what direction the device user is facing to properly interpret the air gesture. For this reason, current gesture detection implementations may require the device to be in a particular orientation or for a calibration to be performed before each session to accurately detect an air gesture.

SUMMARY

In a first illustrative embodiment, a system includes a vehicle sensor indicating heading angle, a plurality of seating zones each including an orientation sensor indicating seating angle, and a component within one of the seating zones programmed to provide interface information descriptive of commands and associated air gestures oriented to the one seating zone. The component may also be programmed to perform one of the commands responsive to a personal device detecting the corresponding air gesture, accounting for the heading angle and seating angle.

In a second illustrative embodiment, a method includes adjusting gesture input from a personal device to create acceleration data in a reference frame of an in-vehicle component in a seating zone using orientation of the device, vehicle heading relative to magnetic North, and orientation angle for the seating zone including the device. When the acceleration data matches an air gesture in a library of air gestures, the method includes sending a command to the component corresponding to the matching air gesture.

In a third illustrative embodiment, a system includes a processor, an acceleration sensor, an orientation sensor, a wireless transceiver, and a memory storing a gesture detection service. The gesture detection service includes instructions that, when executed by the processor, cause the processor to detect air gestures performed by vehicle occupants according to data from the acceleration sensor and the orientation sensor. An application includes instructions that, when executed by the processor, cause the processor to receive interface information descriptive of commands and corresponding air gestures for the commands from a vehicle component using the wireless transceiver, utilize the gesture detection service to determine when the gestures are performed, and send one of the commands to the vehicle component using the wireless transceiver responsive to the gesture detection service determining that the corresponding air gesture for the command is performed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Air gestures refer to device control features performed by a user making movements through the air. Many gesture-input systems use sensors that are fixed in location with respect to gravity and magnetic North, such that once North and down are calibrated for a session, the calibration does not require further adjustment. However, a fixed initial calibration may require adjustment for use in the vehicle environment. In an example, the heading of the vehicle may change as the vehicle moves, or the direction of the user may change as vehicle seats rotate in orientation with respect to the vehicle. To capture gestures in such an environment, a gesture detector may perform adjustments that are made to properly reorient the gestures with respect to an initial calibration.

The gesture detector may be configured to detect air gestures performed by vehicle occupants using their phones (or other personal devices) for use in controlling vehicle functions. The air gestures may be identified using coordinates in relation to gravity and magnetic North, and then normalized by the gesture detector with respect to the orientation of the vehicle and the user's seat within the vehicle. Thus, the gesture detector may capture air gestures as the vehicle moves or as vehicle seats rotate in orientation to the vehicle, and may perform adjustments to properly reorient the gestures. Further aspects of the disclosure are described in detail below.

Figure 1A:
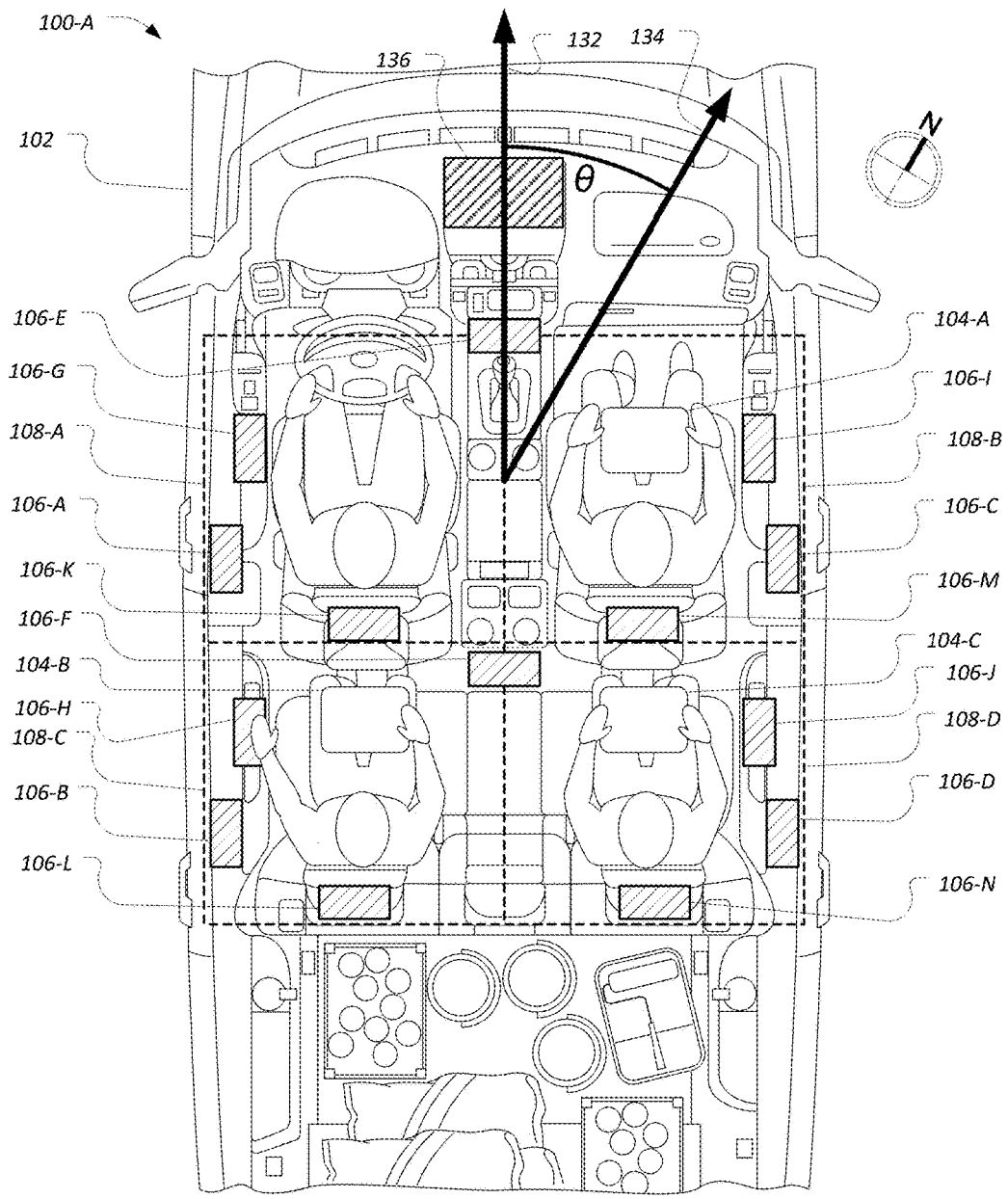
FIG. 1A illustrates an example system including a vehicle having a mesh of in-vehicle components configured to locate and interact with users and personal devices of the users.

FIG. 1A illustrates an example system 100 including a vehicle 102 having a mesh of in-vehicle components 106 configured to locate and interact with users and personal devices 104 of the users. The system 100 may be configured to allow the users, such as vehicle occupants, to seamlessly interact with the in-vehicle components 106 in the vehicle 102 or with any other framework-enabled vehicle 102. Moreover, the interaction may be performed without requiring the personal devices 104 to have been paired with or be in communication with a head unit or other centralized computing platform of the vehicle 102.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The personal devices 104-A, 104-B and 104-C (collectively 104) may include mobile devices of the users, and/or wearable devices of the users. The mobile devices may be any of various types of portable computing device, such as cellular phones, tablet computers, smart watches, laptop computers, portable music players, or other devices capable of networked communication with other mobile devices. The wearable devices may include, as some non-limiting examples, smartwatches, smart glasses, fitness bands, control rings, or other personal mobility or accessory device designed to be worn and to communicate with the user's mobile device.

The in-vehicle components 106-A through 106-N (collectively 106) may include various elements of the vehicle 102 having user-configurable settings. These in-vehicle components 106 may include, as some examples, overhead light in-vehicle components 106-A through 106-D, climate control in-vehicle components 106-E and 106-F, seat control in-vehicle components 106-G through 106-J, and speaker in-vehicle components 106-K through 106-N. Other examples of in-vehicle components 106 are possible as well, such as rear seat entertainment screens or automated window shades. In many cases, the in-vehicle component 106 may expose controls such as buttons, sliders, and touchscreens that may be used by the user to configure the particular settings of the in-vehicle component 106. As some possibilities, the controls of the in-vehicle component 106 may allow the user to set a lighting level of a light control, set a temperature of a climate control, set a volume and source of audio for a speaker, and set a position of a seat.

The vehicle 102 interior may be divided into multiple zones 108, where each zone 108 may be associated with a seating position within the vehicle 102 interior. For instance, the front row of the illustrated vehicle 102 may include a first zone 108-A associated with the driver seating position, and a second zone 108-B associated with a front passenger seating position. The second row of the illustrated vehicle 102 may include a third zone 108-C associated with a driver-side rear seating position and a fourth zone 108-D associated with a passenger-side rear seating position. Variations on the number and arrangement of zones 108 are possible. For instance, an alternate second row may include an additional fifth zone 108 of a second-row middle seating position (not shown). Four occupants are illustrated as being inside the example vehicle 102, three of whom are using personal devices 104. A driver occupant in the zone 108-A is not using a personal device 104. A front passenger occupant in the zone 108-B is using the personal device 104-A. A rear driver-side passenger occupant in the zone 108-C is using the personal device 104-B. A rear passenger-side passenger occupant in the zone 108-D is using the personal device 104-C.

Each of the various in-vehicle components 106 present in the vehicle 102 interior may be associated with the one or more of the zones 108. As some examples, the in-vehicle components 106 may be associated with the zone 108 in which the respective in-vehicle component 106 is located and/or the one (or more) of the zones 108 that is controlled by the respective in-vehicle component 106. For instance, the light in-vehicle component 106-C accessible by the front passenger may be associated with the second zone 108-B, while the light in-vehicle component 106-D accessible by a rear passenger-side occupant may be associated with the fourth zone 108-D. It should be noted that the illustrated portion of the vehicle 102 in FIG. 1A is merely an example, and more, fewer, and/or differently located in-vehicle components 106 and zones 108 may be used.

Figure 1B:
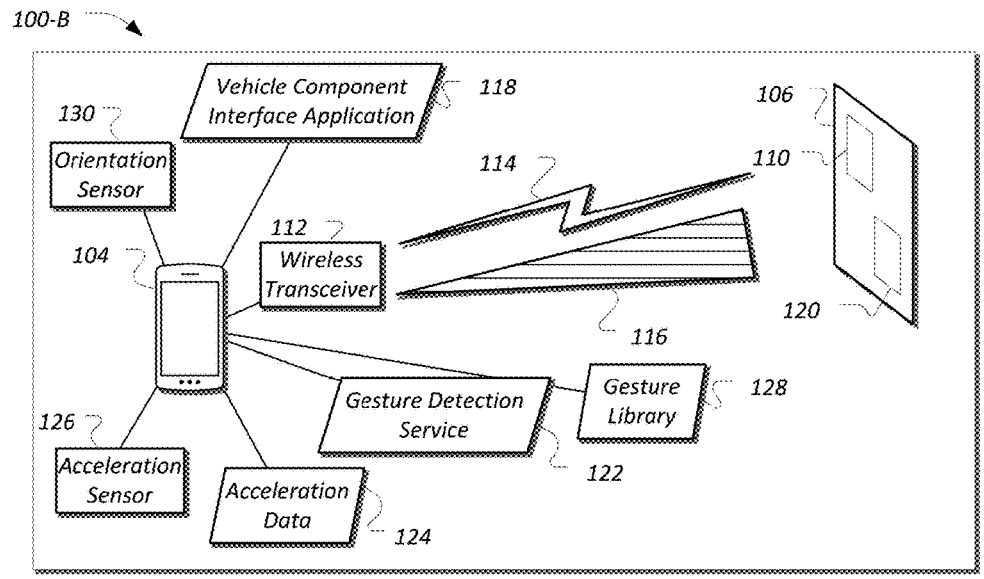
FIG. 1B illustrates an example in-vehicle component equipped with a wireless transceiver configured to facilitate detection of and identify proximity of the personal devices.

Referring to FIG. 1B, each in-vehicle component 106 may be equipped with a wireless transceiver 110 configured to facilitate detection of and identify proximity of the personal devices 104. In an example, the wireless transceiver 110 may include a wireless device, such as a BLUETOOTH Low Energy transceiver configured to enable low energy BLUETOOTH signal intensity as a locator, to determine the proximity of the personal devices 104. Detection of proximity of the personal device 104 by the wireless transceiver 110 may, in an example, cause a vehicle component interface application 118 of the detected personal device 104 to be activated.

In many examples the personal devices 104 may include a wireless transceiver 112 (e.g., a BLUETOOTH module, a ZIGBEE transceiver, a Wi-Fi transceiver, an IrDA transceiver, an RFID transceiver, etc.) configured to communicate with other compatible devices. In an example, the wireless transceiver 112 of the personal device 104 may communicate data with the wireless transceiver 110 of the in-vehicle component 106 over a wireless connection 114. In another example, a wireless transceiver 112 of a wearable personal device 104 may communicate data with a wireless transceiver 112 of a mobile personal device 104 over a wireless connection 114. The wireless connections 114 may be a BLUETOOTH Low Energy (BLE) connection, but other types of local wireless connection 114, such as Wi-Fi or Zigbee may be utilized as well.

The personal devices 104 may also include a device modem configured to facilitate communication of the personal devices 104 with other devices over a communications network. The communications network may provide communications services, such as packet-switched network services (e.g., Internet access, VoIP communication services), to devices connected to the communications network. An example of a communications network may include a cellular telephone network. To facilitate the communications over the communications network, personal devices 104 may be associated with unique device identifiers (e.g., mobile device numbers (MDNs), Internet protocol (IP) addresses, identifiers of the device modems, etc.) to identify the communications of the personal devices 104 over the communications network. These personal device 104 identifiers may also be utilized by the in-vehicle component 106 to identify the personal devices 104.

The vehicle component interface application 118 may be an application installed to the personal device 104. The vehicle component interface application 118 may be configured to facilitate vehicle occupant access to features of the in-vehicle components 106 exposed for networked configuration via the wireless transceiver 110. In some cases, the vehicle component interface application 118 may be configured to identify the available in-vehicle components 106, identify the available features and current settings of the identified in-vehicle components 106, and determine which of the available in-vehicle components 106 are within proximity to the vehicle occupant (e.g., in the same zone 108 as the location of the personal device 104). The vehicle component interface application 118 may be further configured to display a user interface descriptive of the available features, receive user input, and provide commands based on the user input to allow the user to control the features of the in-vehicle components 106. Thus, the system 100 may be configured to allow vehicle occupants to seamlessly interact with the in-vehicle components 106 in the vehicle 102, without requiring the personal devices 104 to have been paired with or be in communication with a head unit of the vehicle 102.

Each in-vehicle component 106 may also be equipped with a notification device 120 configured to facilitate identification of the physical location of the in-vehicle component 106 within the vehicle 102 by the occupants of the vehicle 102. In an example, the notification device 120 may be a backlight of the in-vehicle component 106. In another example, the notification device 120 may utilize other features of the controls of the set of controls of the in-vehicle component 106 to perform the notification, such as existing lighting elements of the in-vehicle component 106. In yet a further example, the notification device 120 may utilize audio chimes or other sounds emanating from the in-vehicle component 106 to aid in the location of the in-vehicle component 106. In an even further example, the notification device 120 may utilize haptic feedback devices or tactile feedback devices to provide a physical indication to a user (e.g., to a user's hand) of the particular location of the in-vehicle component 106. It should also be noted that these approaches may be combined, and the notification device(s) 120 may perform more than one of the aforementioned or other notifications.

The system 100 may use one or more device location-tracking techniques to identify the zone 108 in which the personal device 104 is located. Location-tracking techniques may be classified depending on whether the estimate is based on proximity, angulation, or lateration. Proximity methods are "coarse-grained," and may provide information regarding whether a target is within a predefined range but they do not provide an exact location of the target. Angulation methods estimate a position of the target according to angles between the target and reference locations. Lateration provide an estimate of the target location, starting from available distances between target and references. The distance of the target from a reference can be obtained from a measurement of signal strength 116 over the wireless connection 114 between the wireless transceiver 110 of the in-vehicle component 106 and the wireless transceiver 112 of the personal device 104, or from a time measurement of either arrival (TOA) or difference of arrival (TDOA).

One of the advantages of lateration using signal strength 116 is that it can leverage the already-existing received signal strength indication (RSSI) signal strength 116 information available in many communication protocols. For example, iBeacon uses the RSSI signal strength 116 information available in the BLUETOOTH Low-Energy (BLE) protocol to infer the distance of a beacon from a personal device 104 (i.e. a target), so that specific events can be triggered as the personal device 104 approaches the beacon. Other implementations expand on the concept, leveraging multiple references to estimate the location of the target. When the distance from three reference beacons are known, the location can be estimated in full (trilateration) from the following equations:

$$d_1^2 = (x-x_1)^2 + (y-y_1)^2 + (z-z_1)^2$$
$$d_2^2 = (x-x_2)^2 + (y-y_2)^2 + (z-z_2)^2$$
$$d_3^2 = (x-x_3)^2 + (y-y_3)^2 + (z-z_3)^2 \quad (1)$$

Figure 1C:
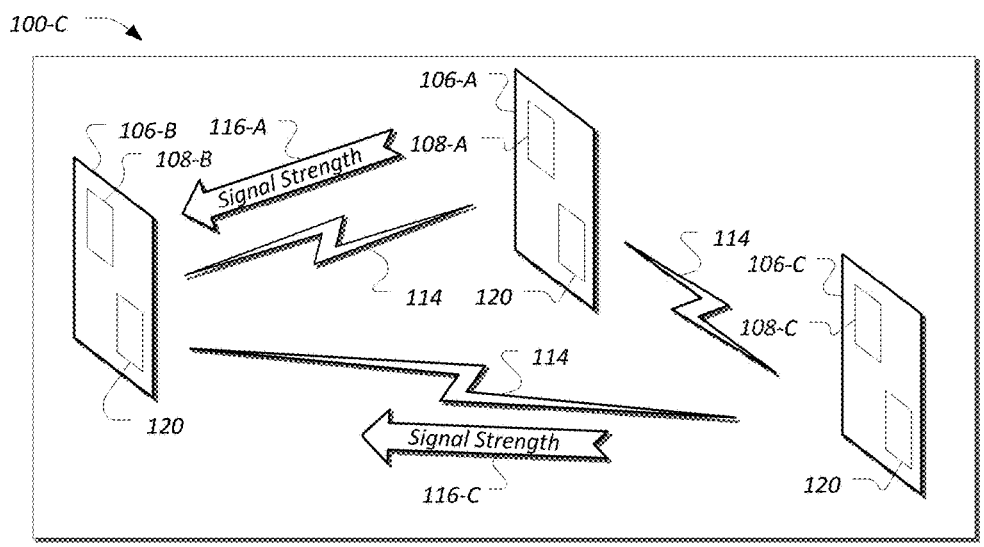
FIG. 1C illustrates an example in-vehicle component requesting signal strength from other in-vehicle components of the vehicle.

In an example, as shown in FIG. 1C, an in-vehicle component 106-B may broadcast or otherwise send a request for signal strength 116 to other in-vehicle components 106-A and 106-C of the vehicle 102. This request may cause the other in-vehicle components 106-A and 106-C to return wireless signal strength 116 data identified by their respective wireless transceiver 110 for whatever devices they detect (e.g., signal strength 116-A for the personal device 104 identified by the wireless transceiver 110-A, signal strength 116-C for the personal device 104 identified by the wireless transceiver 110-C). Using these signal strengths 116-A and 116-C, as well as signal strength 116-B determined by the in-vehicle component 106-B using its wireless transceiver 110-B, the in-vehicle component 106-B may use the equations (1) to perform trilateration and locate the personal device 104. As another possibility, the in-vehicle component 106 may identify the personal device 104 with the highest signal strength 116 at the in-vehicle component 106 as being the personal device 104 within the zone 108 as follows:

$$\text{Personal Device} = i \Rightarrow \max_{i=1,n} RSSI_i \quad (5)$$

Thus, the mesh of in-vehicle components 106 and the personal devices 104 may accordingly be utilized to allow the in-vehicle components 106 to identify in which zone 108 each personal device 104 is located.

As yet another possibility for locating of the personal device 104 within the vehicle 102, signal strengths 116 of the personal device 104 to each of the in-vehicle components 106 of a particular zone 108 may be used to determine whether the personal device 104 is located within that zone 108. As yet a further possibility for locating of the personal device 104 within the vehicle 102, symmetrical sets of in-vehicle components 106 with a symmetrical vehicle 102 cabin may be utilized to estimate the location of the personal device 104.

Regardless of the particular approach that is used, the mesh of in-vehicle components 106 and the personal devices 104 may be utilized to allow the in-vehicle components 106 to identify in which zone 108 each personal device 104 is located. As each of the in-vehicle components 106 is also associated with a zone 108, the in-vehicle components 106 may accordingly identify the personal device 104 to be notified as being the personal device 104 that is associated with the same zone 108 with which the in-vehicle component 106 is associated.

As one possibility, the in-vehicle component 106 may utilize signal strength 116 data received from the personal devices 104 in the vehicle 102 to identify which of the personal devices 104 is in use by the occupant physically interacting with the seating controls in-vehicle component 106-H. For instance, identifying the personal device 104 with the highest signal strength 116 at the in-vehicle component 106 would likely identify the correct personal device 104, e.g., as follows:

$$\text{Personal Device} = i \Rightarrow \max_{i=1,n} RSSI_i \quad (5)$$

Referring back to FIGS. 1A and 1B, gesture detection may be implemented to allow for detection of air gestures performed by vehicle occupants using their personal devices 104. The air gestures performed by the users may be used in support of the control of functions of the in-vehicle components 106. In some examples, the identification of air gestures may be performed by a gesture detection service 122. The gesture detection service 122 may receive acceleration data 124 from acceleration sensors 126 (e.g., a triple-axis acceleration sensor), process the acceleration data 124 (as discussed in detail below), and compare the processed acceleration data 124 to a library 128 of air gestures. If the acceleration data 124 matches an air gesture in the library 128, the gesture detection service 122 provides information indicating the recognized air gesture that was performed. This may allow for detected gesture information to be sent back to the vehicle component interface application 118 or other calling application for processing.

In order to enable integration of gesture into existing interfaces, the gesture detection service 122 may be executed as a background process on the personal device 104. This gesture detection service 122 may execute as a black box and be implemented by the vehicle component interface application 118 and/or third-party applications installed to the personal device 104. For instance, this may be done by referencing intents in the background service (e.g., Android/Apple OS) or by referencing functions in an accompanying library (e.g., for Windows OS).

Once instantiated, the gesture detection service 122 may provide debug output (that can be enabled/disabled as needed) for third-party developers to properly integrate and test their gesture(s) as desired. When interfacing with the gesture service, users may receive an indication that the personal device 104 is ready to accept air gestures. In an example, the gesture detection service 122 may provide an indication of the ready status of the gesture detection service 122 via playing a sound through a speaker of the personal device 104, and/or actuating a haptic feedback device of the personal device 104 to communicate to the user that air gestures are ready to be recognized. While examples herein are described in terms of a gesture detection service 122, it should be noted that in other examples, the vehicle component interface application 118 or another application may implement some or all of the processing performed by the gesture detection service 122 as described.

A challenge with implementing a gesture detection service 122 for air gestures is the establishment of a proper reference frame for air gesture detection relative to the user. As shown in FIG. 1B, the personal device 104 can include orientation sensors 130 (e.g., triple-axis magnetometer sensors, gyroscopic sensors) to determine the direction of magnetic North 134 and the direction of gravity with respect to the personal device 104. However, the personal device 104 may have greater difficulty in determining in what direction the user holding the personal device 104 is facing. Accordingly, gesture detection may require either the personal device 104 to be in a certain orientation, or for a calibration to be performed before each session, in order for the air gestures to be detected correctly.

In an example, a passenger sitting in a second row of the vehicle 102 may wish to slide through different pictures displayed on a screen in-vehicle component 106 provided on the back of the front row seat. The gesture detection service 122 may accordingly be configured to recognize left-to-right and right-to-left air gesture motions to either advance or back-trace through the slideshow. Additionally, the gesture detection service 122 may be configured to identify sliding forward and backward air gestures as being different gestures from the left-to-right and right-to-left air gesture motions.

Referring back to FIG. 1A, the vehicle heading 132 may vary with respect to magnetic North 134. As the vehicle 102 proceeds along a route, alignment angle θ of the vehicle heading 132 with respect to magnetic North 134 may change. In an example, after taking a left turn the vehicle 102 alignment angle θ with respect to magnetic North 134 may be adjusted by ninety degrees. The vehicle may include a vehicle compass sensor 136 (e.g., a triple-axis magnetometer sensor) to provide information regarding the current vehicle 102 alignment angle θ with respect to magnetic North 134. If an initial calibration of magnetic North 134 was performed before the turn, if no adjustments are made to the calibration, a left-to-right air gesture motion made after the turn may be incorrectly mapped to a forward air gesture motion.

Figure 2A:
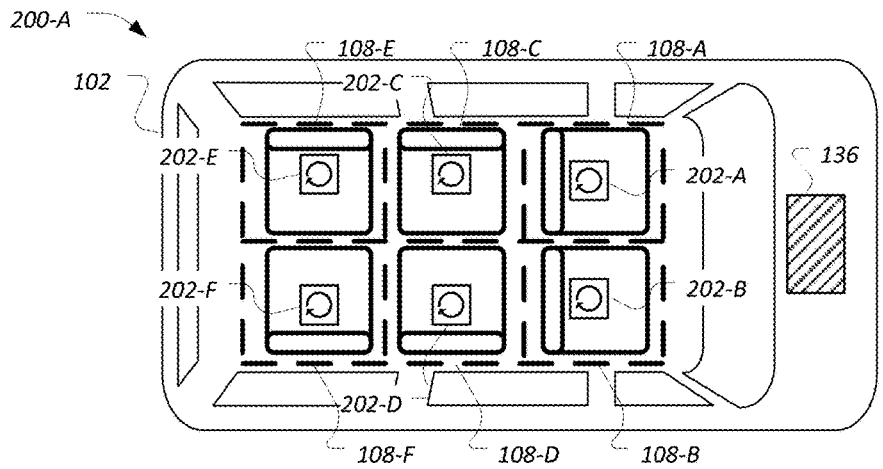
FIGS. 2A-2C illustrate examples of vehicles having different seating arrangements.
Figure 2B:
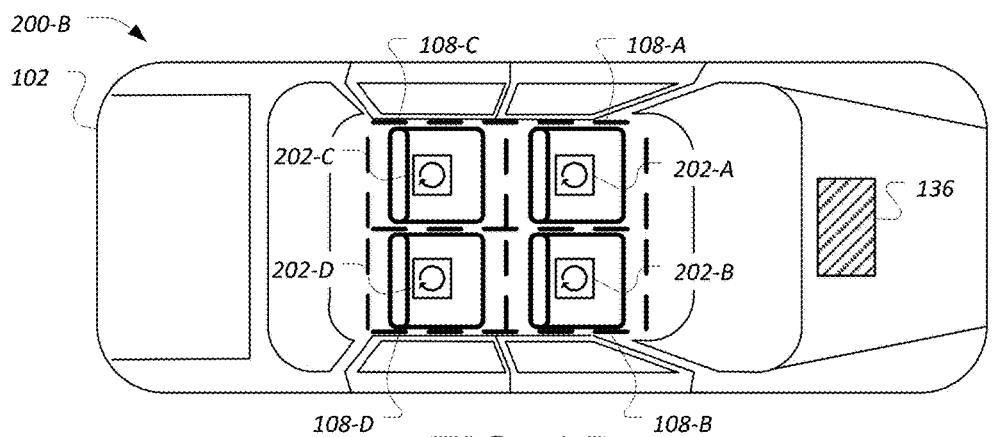
Figure 2C:
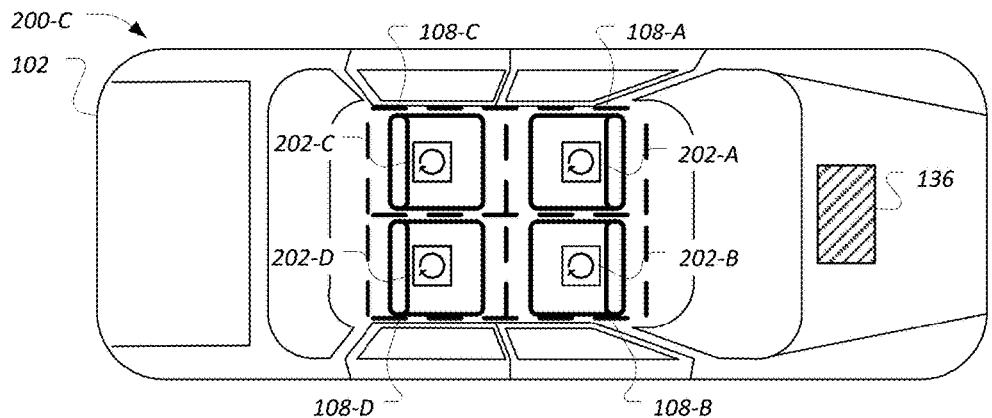

FIGS. 2A through 2C illustrate examples of vehicles 102 having different seating arrangements 200. Generally, seating arrangements in a vehicle 102 may have variability in seating zone 108 orientation with respect to the vehicle heading 132. Some vehicles 102, such as illustrated in FIG. 2A, have seating zones 108 that may include rows of passengers at the sides facing towards a center of the vehicle 102. If the gesture detection service 122 assumes that each vehicle 102 occupant is facing forwards for purpose of gesture detection, then air gesture detection with respect to a personal device 104 belonging to a passenger on the right-side of the vehicle 102 may interpret opposite motions relative to those estimated by a personal device 104 belonging to a passenger on the left-side of the vehicle 102, where both would be orthogonal to the motion estimate of a personal device 104 belonging to the driver. Other vehicles 102, such as illustrated in FIG. 2C may have seats that face the rear of the vehicle 102. Still other vehicles 102 may include seating zones 108 with adjustable orientations. For instance, a vehicle 102 may have seating zones 108 that may swivel from facing forward as shown in FIG. 2B, to facing rearward as shown in FIG. 2C.

In order to establish a proper reference frame relative to the user, each seating zone 108 may include an orientation module 202 providing local orientation with respect to the orientation of the seating zone 108. The orientation modules 202 can be implemented as in-vehicle components 106 within the respective seating zones 108 to enable determination of which personal device 104 is located in which seating zone 108 of the vehicle 102. In an example, the orientation modules 202 may include sensors configured to provide an angle or other indication of offset of the direction of the seating zone 108 with respect to the heading of the vehicle 102. The information received from the orientation modules 202 with respect to the seating zone 108 orientation may be referred to as seat-relative-orientation parameter, $\alpha_{seat}$.

Referring in more detail to FIG. 2A, the example seating arrangement 200-A includes six seating zones 108. These include a first zone 108-A associated with a front-row driver seating position, a second zone 108-B associated with a front-row passenger seating position, a third zone 108-C associated with a second-row driver-side seating position, a fourth zone 108-D associated with a second-row passenger-side seating position, a fifth zone 108-E associated with a third-row driver-side seating position, and a sixth zone 108-F associated with a third-row passenger-side seating position. Each seating zone 108 includes an orientation module 202 from which the personal device 104 of the user can retrieve the orientation offset for the respective seating zone 108. For instance, the orientation module 202-A in the seating zone 108-A and the orientation module 202-B in the seating zone 108-B may each indicate $\alpha_{seat}$ of no offset from vehicle heading 132 for the respective zones 108; the orientation module 202-C in the seating zone 108-C and the orientation module 202-E in the seating zone 108-E may each indicate an $\alpha_{seat}$ of ninety degrees clockwise from vehicle heading 132 for the respective zones 108, and the orientation module 202-D in the seating zone 108-D and the orientation module 202-F in the seating zone 108-F may each indicate $\alpha_{seat}$ of ninety degrees counterclockwise from vehicle heading 132 for the respective zones 108.

Referring in more detail to FIG. 2B, the example seating arrangement 200-B includes four seating zones 108. These include a first zone 108-A associated with a front-row driver seating position, a second zone 108-B associated with a front-row passenger seating position, a third zone 108-C associated with a second-row driver-side seating position, and a fourth zone 108-D associated with a second-row passenger-side seating position. As shown, the orientation module 202-A in the seating zone 108-A, the orientation module 202-B in the seating zone 108-B, the orientation module 202-C in the seating zone 108-C, and the orientation module 202-D in the seating zone 108-D may each indicate an $\alpha_{seat}$ of no offset from vehicle heading 132 for the respective zones 108.

Referring in more detail to FIG. 2C, in the example seating arrangement 200-C the orientation of the seating zones 108-A and 108-B has been rotated from their placement in the example seating arrangement 200-B. Thus, the orientation module 202-A in the seating zone 108-A and the orientation module 202-B in the seating zone 108-B may each indicate an $\alpha_{seat}$ of one hundred and eighty degree offset from vehicle heading 132 for the respective zones 108, while the orientation module 202-C in the seating zone 108-C and the orientation module 202-D in the seating zone 108-D may continue to indicate an $\alpha_{seat}$ of no offset from vehicle heading 132 for the respective zones 108.

By using the $\alpha_{seat}$ data from the orientation module 202 of the current seating zone 108 of the user, and the vehicle alignment angle θ from the vehicle compass sensor 136, the gesture detection service 122 can adjust the data received from the acceleration sensors 126 and orientation sensors 130 to account for the current vehicle 102 heading and seating zone 108 orientation with respect to the vehicle heading 132. Thus, air gesture input received by the user moving the personal device 104 may be adjusted to remain consistent with respect to the cabin of the vehicle 102.

Figure 3:
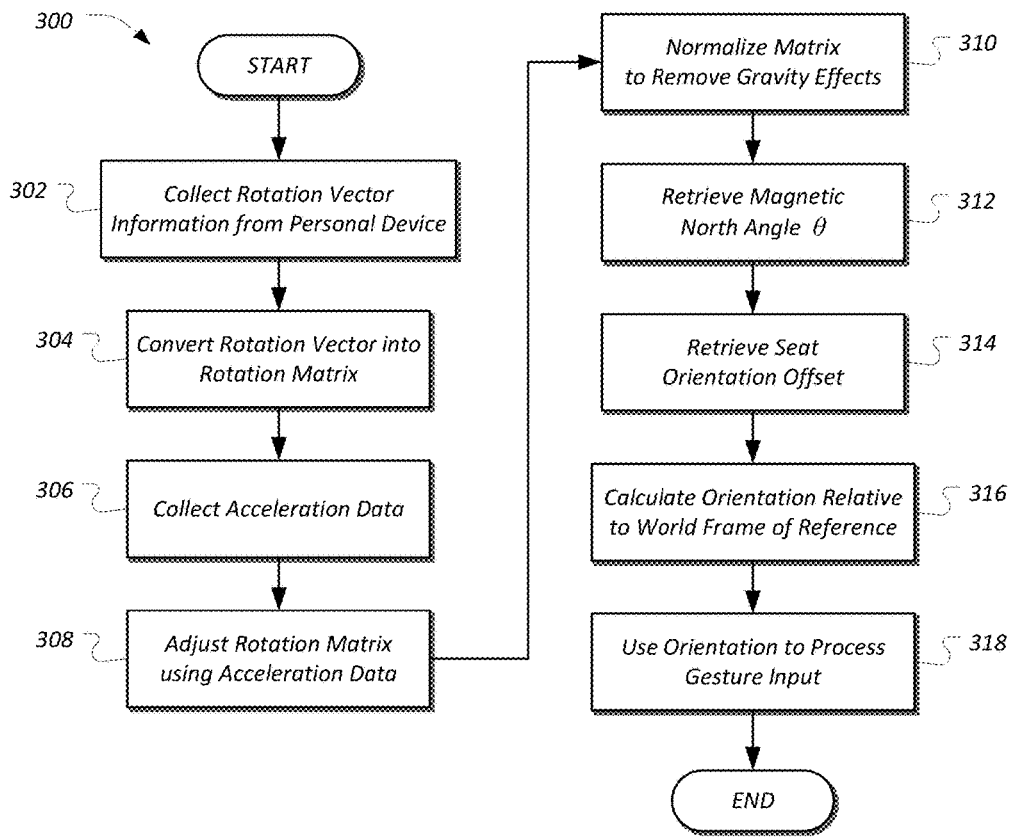
FIG. 3 illustrates an example process for collecting gesture data and normalizing the data to the user orientation reference frame.

FIG. 3 illustrates an example process 300 for collecting gesture data and normalizing the data to the user orientation reference frame. Generally, the data from the acceleration sensors 126 and orientation sensors 130 is combined to establish the orientation of the personal device 104 relative to gravity and earth magnetic North 134. (Some personal devices 104 may utilize different combination of sensors other than acceleration sensors 126 and orientation sensors 130, but for purposes of the disclosure the personal devices 104 are capable of providing a current estimate of the orientation of the personal device 104.) This orientation may be provided in the form of an orientation matrix. An initial reference frame can therefore be established from the orientation matrix data with the Y-axis pointing to the magnetic North 134, the Z-axis point upward to gravity and the X-axis pointing 90 degrees clockwise around the Z-axis from the Y-axis. The vehicle compass sensor 136 may be utilized to determine an occupant seating zone 108 orientation relative to the magnetic North 134 (e.g., assuming the occupant seat faces the front of the vehicle 102). Using this angle offset, combined with the orientation matrix, the gesture recognizer can manipulate (by use of angle matrix formulae) the sensor data to provide true orientation and magnitude from the user perspective. By performing adjustments to the received sensor data using the orientation matrix, users can perform air gesture motions using their personal devices 104 independent of the vehicle 102 orientation, seating zone 108 orientation, and personal device 104 orientation. Accordingly, the vehicle 102 passenger users can interact with the personal device 104 in an orientation that is natural and easy to use for the specific task.

At operation 302, the personal device 104 collects rotation vector information from the personal device 104. In an example, the gesture detection service 122 retrieves information from the orientation sensors 130 of the personal device 104. This information may include, for example, an X angle, a Y angle, and a Z angle with respect to orientation of the personal device 104. The information may allow the personal device 104 to identify, for example, whether the personal device 104 is being held in portrait or landscape orientation.

At operation 304, the personal device 104 converts the rotation vector into a rotation matrix. In an example, the gesture detection service 122 utilizes the x, y, and z angles retrieved at operation 302 and basic rotation matrices to construct a rotation matrix=R[3×3] incorporating the X, Y, and Z angles of the personal device 104.

At operation 306, the personal device 104 collects acceleration data 124. In an example, the gesture detection service 122 retrieves acceleration data 124 from the acceleration sensors 126 of the personal device 104 indicative of current acceleration forces being applied to the personal device 104. The current acceleration data 124 may be used to populate acceleration data=A[3×1].

At operation 308, the personal device 104 adjusts the rotation matrix using the acceleration data 124. In an example, the gesture detection service 122 multiplies the rotation matrix by the acceleration data 124 as follows: (R[3×3]×A[3×1])=N[3×1]. Thus, the gesture detection service 122 transforms the acceleration data 124 from the personal device 104 reference frame into the world frame defined by Y-Magnetic North and Z-gravity. It should be noted that in some examples the Z-axis may be oriented opposite to the direction of the gravity field.

At operation 310, the personal device 104 normalizes the rotation matrix, as adjusted, to remove effects of gravity. In an example, the gesture detection service 122 computes an x value as N[1,1]/g; a y value as N[2,1]/g; and a z value as ((N[3,1]−g)/g), resulting in a force tuple F=[x,y,z].

At operation 312, the personal device 104 retrieves the magnetic North angle θ for the vehicle 102. In an example, the gesture detection service 122 retrieves the angle θ from the vehicle compass sensor 136 of the vehicle 102. As one possibility, the vehicle compass sensor 136 data may be accessible wirelessly from the vehicle compass sensor 136. As another possibility, the vehicle compass sensor 136 may be available to the gesture detection service 122 via an in-vehicle component 106 within the seating zone of the personal device 104 (e.g., via the orientation module 202 in communication with the vehicle compass sensor 136).

At operation 314, the personal device 104 retrieves the $\alpha_{seat}$ for the current seating zone 108 of the personal device 104. In an example, the gesture detection service 122 retrieves the $\alpha_{seat}$ value from the orientation module 202 within the seating zone of the personal device 104. The gesture detection service 122 may further perform a sum of the magnetic North angle θ and the $\alpha_{seat}$ value to create a total angle offset At for the seating zone 108 of the personal device 104.

At operation 316, the personal device 104 calculates orientation-independent positioning data (OI) of the personal device 104 relative to a world frame of reference. In an example, the gesture detection service 122 computes the OI as follows: OI(x)=F[0]*cos(At)+F[1]*sin(At); OI(y)=−F[0]*sin(At)+F[1]*cos(At); OI(z)=F[2].

At operation 318, the personal device 104 maintains the OI vector for processing of air gesture input. The OI vector accordingly represents the acceleration of the personal device 104 in a reference frame aligned with the occupant of the seating zone 108 in which the personal device 104 is located. Thus, regardless of the personal device 104 orientation (e.g., with the personal device 104 screen pointing to user in landscape mode, with screen facing downward at a 45 degree angle, etc.), vehicle 102 orientation, and seat configuration, when the user moves the personal device 104 from left to right, the gesture detection service 122 may recognize the acceleration as being on the X-axis. Correspondingly, when the user moves the personal device 104 in front of the user and then back towards the user, the gesture detection service 122 may recognize the acceleration as being on the Y-axis. When the user raises the personal device 104 above the user's head and then back down toward the user's waist, the gesture detection service 122 may recognize the acceleration as being on the Z-axis. After operation 318, the process 300 ends.

The personal device 104 may maintain the OI vector for the duration of receipt of an air gesture. For example, the process 300 may initiate upon detection of acceleration data 124 at least a threshold amount from zero, and the OI vector may be maintained until detection of acceleration data 124 returning to below the threshold amount.

Figure 4:
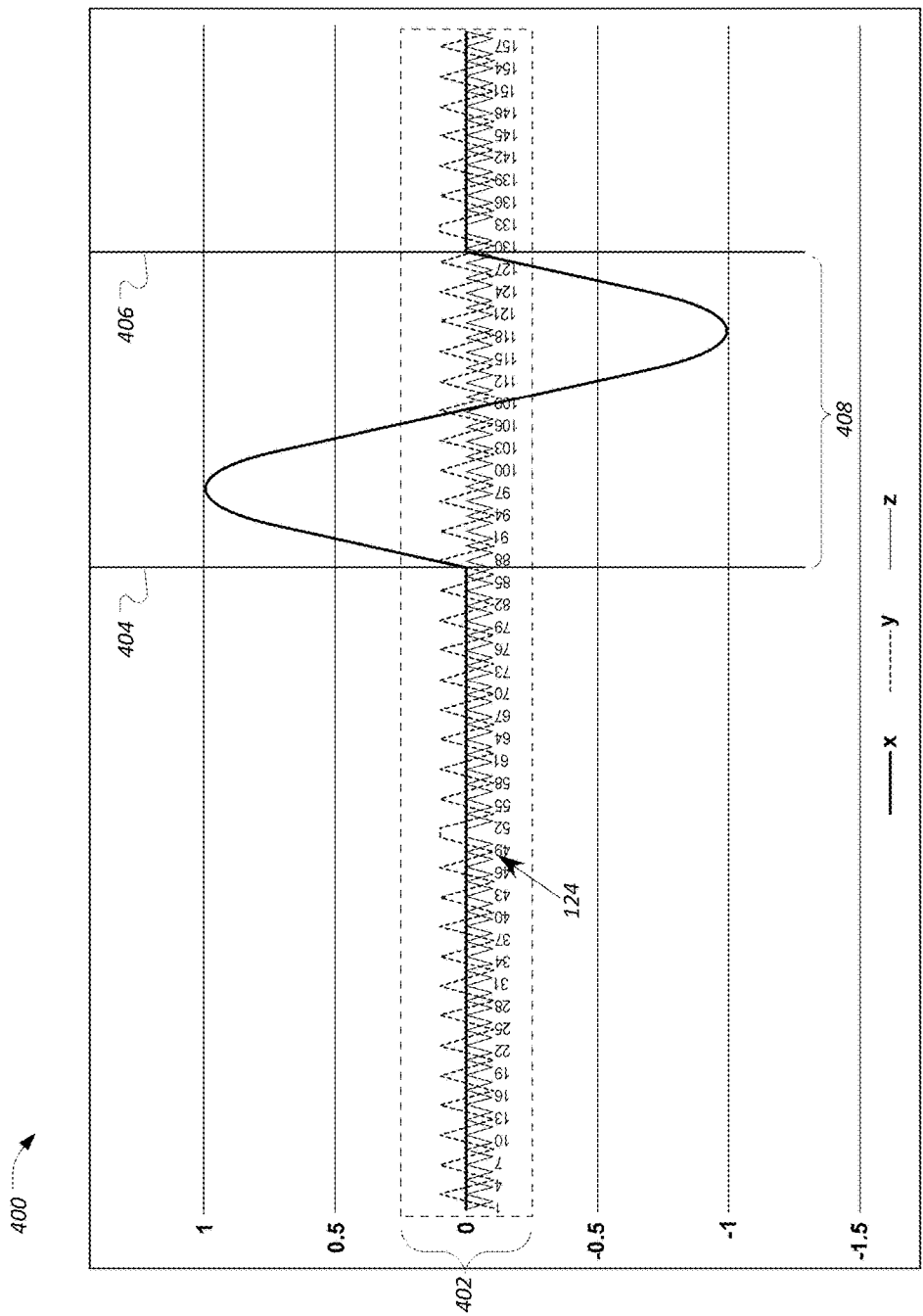
FIG. 4 illustrates an example trace of X, Y, and Z acceleration data from the personal device.

FIG. 4 illustrates an example trace 400 of X, Y, and Z acceleration data 124 from the personal device 104. In the illustrated example, the acceleration data 124 relates to motion of a personal device 104 that was held facing down at a 45-degree angle, 229-degrees offset from true North, and moved from left to right. The example trace 400 illustrates an example of the process 300 normalized to compensate for the alignment of the user. The rotation vector data and the accelerometer data are parsed at a sufficiently high refresh rate by the personal device 104 (in the illustrated example trace 500, at 50 Hz) to collect a sufficient number of samples to identify a performed air gesture in the acceleration data 124.

The example trace 400 also illustrates satisfaction of entrance criteria and exit criteria for analysis of an air gesture. The air gesture may be identified as starting when entrance criteria are met, such as when the acceleration on any one of the three axes (e.g., X, Y, or Z) surpasses a predefined threshold amount. The predefined threshold amount may be set to a minimum amount of acceleration in any direction below which the data from the personal device 104 is considered to be noise and not a gesture. A no-gesture detection zone 402 is illustrated in the example trace 400, indicating acceleration values that fall within the predefined threshold amount below which movements are ignored.

As shown, the entrance criteria are met by the X acceleration data 124 at start time index 404. The air gesture may be identified as concluding when exit criteria are met. As an example, the exit criteria for performing an air gesture may be defined as a specified number of acceleration samples (e.g., X, Y, and Z must be "idle") within the no-gesture detection zone 402 (i.e. the user has stopped moving their personal device 104). As shown, the exit criteria are met by the X acceleration data 124 at exit time index 406. Once the entrance criteria are met (e.g., the threshold has been exceeded either positively or negatively), the process 300 may be performed on acceleration data 124 samples until the exit criteria are met (e.g., acceleration diminishes to within the threshold) indicating that the air gesture has been completed. The data between the start time index 404 and the exit time index 406 (e.g., the acceleration data 124 within time window 408) may be used by the gesture detection service 122 to recognize the air gesture that was performed.

It should be noted that the minimum acceleration to be detected in order for a gesture to be detected may be configurable. For instance, an application using the gesture detection service 122 may configure the predefined threshold amount entrance criteria of the service (e.g., to begin recording a gesture when acceleration exceeds 15 m/s$^2$). As another example, an application using the gesture detection service 122 may configure an exit criteria number of idle samples in order for an air gesture to be deemed complete (e.g., that the number of idle samples=10 (~0.25 sec)).

Figure 5:
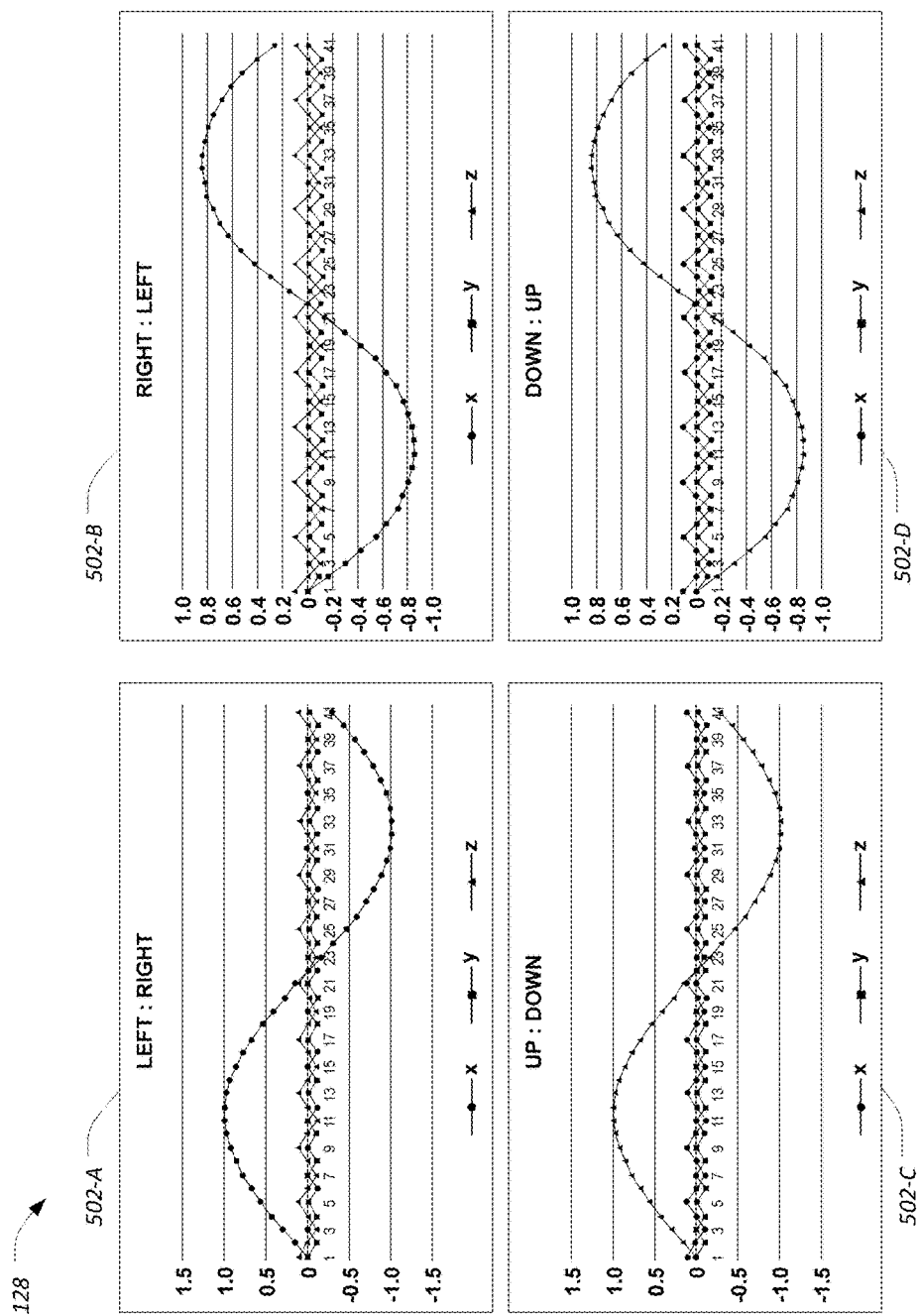
FIG. 5 illustrates an example library of stored air gestures.
Figure 5:
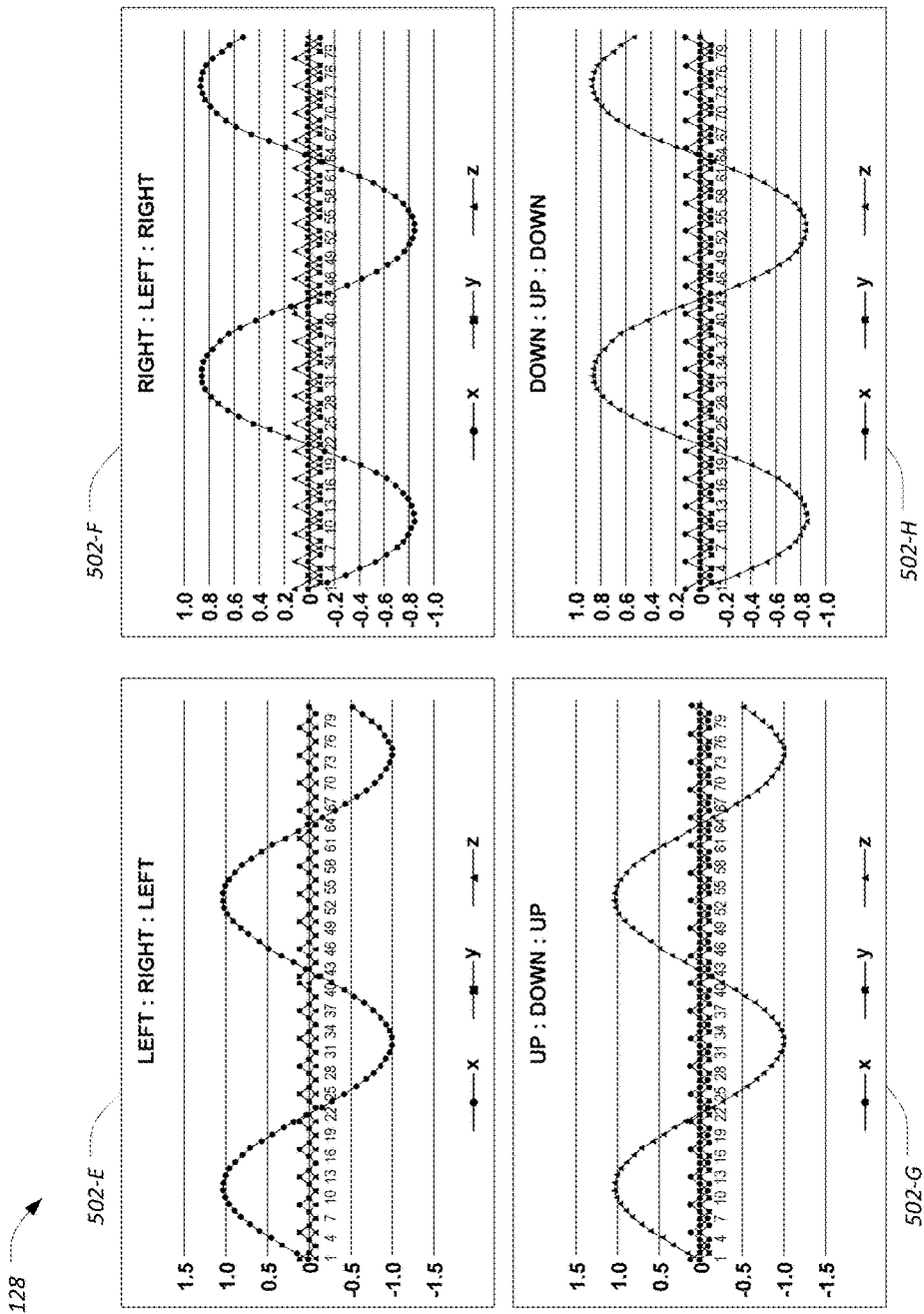

FIG. 5 illustrates an example library 128 of air gestures. The library 128 may include data representing the different air gestures that may be recognized by the gesture detection service 122. As shown, the example library 128 includes a plurality of model gestures 502-A through 502-H (collectively 502). Each model gesture 502 may include a definition of an air gesture that may be performed by the use of the personal device 104.

As an example, the model gesture 502-A indicates a left to right air gesture, as can be seen by the illustrated movement along the X-axis. Similarly, the model gesture 502-B indicates a left-to-right air gesture, as can be seen by the illustrated reverse movement along the X-axis. The model gesture 502-C indicates an up-to-down movement, as shown by the data along the Z-axis, and the model gesture 502-D similarly indicates a down-to-up movement. As some additional examples, the model gesture 502-E indicates a left-to-right-to-left air gesture, the model gesture 502-F indicates a right-to-left-to-right air gesture, the model gesture 502-G indicates an up-to-down-to-up movement, and the model gesture 502-H indicates a down-to-up-to-down movement.

It should be noted that these are merely examples, and more, fewer, or different model gestures 502 may be included in the library 128. For example, a gesture may include movements in different axes, such as an upward and to the left movement, or a downward movement followed by a rightward movement. In some examples, the library 128 may include default gestures (e.g., built into the gesture detection service 122), and also user-defined gestures that may be added by the user to the library 128. For instance, a library maintenance application may be used to allow the user to perform an air gesture, where the performed air gesture may then be added to the library 128 for later detection and use. As another example, developers of applications that use the gesture detection service 122 may create gestures to be loaded into the library 128 of the gesture detection service 122 for use by the developed applications.

The user may move the personal device 104 to perform an air gesture. Once the user completes the air gesture (e.g., as determined by the entrance and then exit criteria being met), the acceleration samples collected from the start time index 404 to the exit time index 406 in time window 408 may be processed by a Hidden Markov Model (HMM). This model transforms the air gesture into a sequence for comparison against the library 128 of stored gestures.

Figure 6:
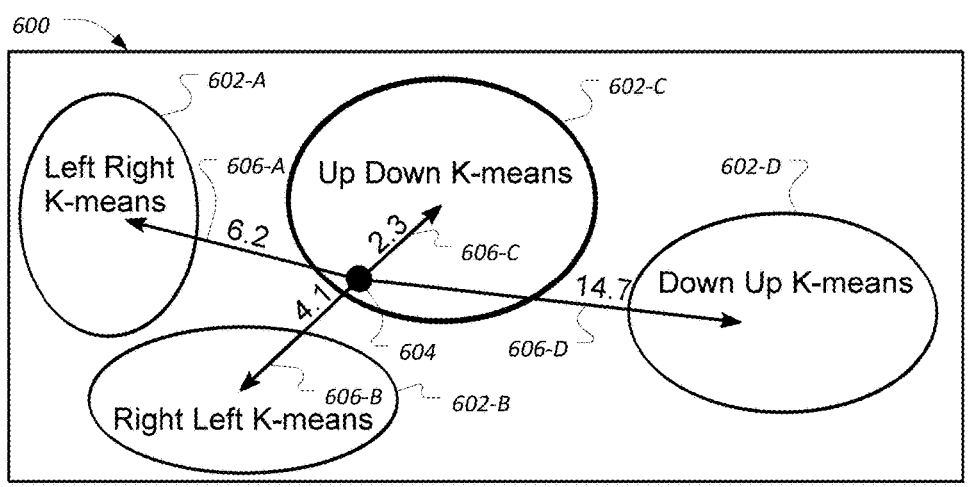
FIG. 6 illustrates an example of k-means matching of a performed air gesture to the library of air gestures.

FIG. 6 illustrates an example 600 of k-means matching of performed air gestures to a library 128 of gestures. The stored gestures of the library 128 may be pre-processed into k-means clusters 602 which each have a defined centroid. As shown, the example 600 includes a k-means cluster 602-A for the left-to-right model gesture 502-A, a k-means cluster 602-B for the right-to-left model gesture 502-B, a k-means cluster 602-C for the up-to-down model gesture 502-C, and a k-means cluster 602-D for the up-to-down model gesture 502-D.

To identify an air gesture performed by a user, the performed air gesture is compared to each k-means cluster 602, such that a Cartesian distance 606 is calculated between the performed air gesture location and the centroid of each k-means cluster 602. This may be performed to find the minimum Cartesian distance 606 from the HMM point 604 to the k-means cluster 602 centroids and verify the HMM point 604 is within the radius of the k-means cluster. After a gesture has been identified with the smallest Cartesian distance 606 and within the radius of the k-means cluster 602, the air gesture may be identified. If the air gesture falls outside the radius of any of the k-means clusters 602, the air gesture is unrecognized and may be ignored.

It should be noted that the minimum probability for a gesture to be recognized may be configurable. For instance, an application may configure the gesture detection service 122 such that the HMM point 604 compared to a k-means centroid 602 is to be within 95% probability for the air gesture to be recognized.

Figure 7:
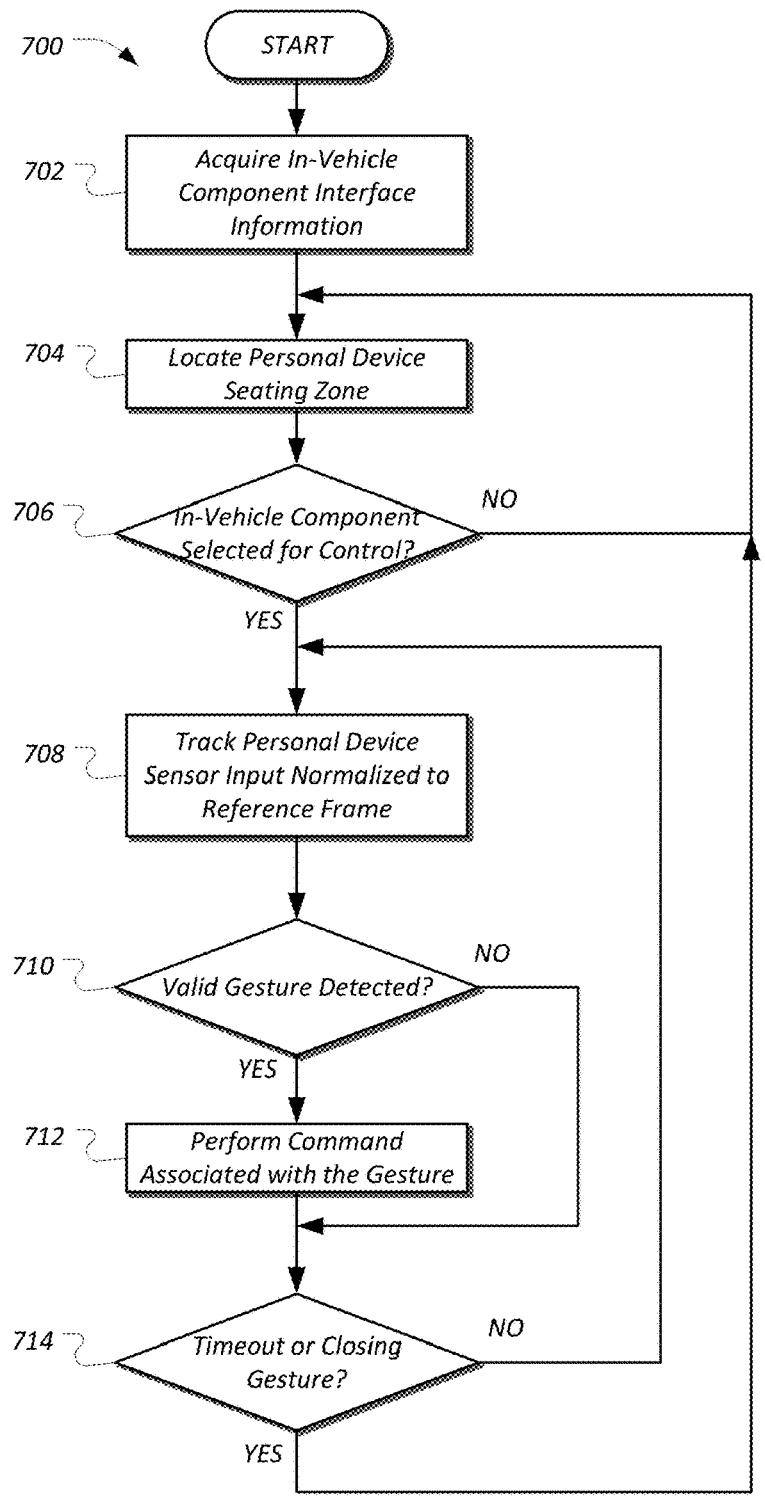
FIG. 7 illustrates an example process for detection of air gestures by the gesture detection service.

FIG. 7 illustrates an example process 700 for detection of air gestures by the gesture detection service 122. While the process 700 is described as providing air gesture detection for use by the vehicle component interface application 118, it should be noted that the gesture detection service 122 maybe useful for other applications installed to the personal device 104 as well.

At operation 702, the personal device 104 acquires in-vehicle component 106 interface information. The information may specify the available features of the in-vehicle components 106. In an example, the personal device 104 may collect advertisement data information from the in-vehicle components 106 to identify what in-vehicle components 106 are located in the seating zones 108 of the passengers and what functionality is provided. The advertisement data may include information indicative of the functionality of the in-vehicle components 106, of the locations of seating zones 108 of the in-vehicle components 106. The information may also indicate whether air gestures are available for control of the in-vehicle components 106. If so, information may also indicate which air gestures may be used to perform what commands.

At operation 704, the personal device 104 uses the mesh of in-vehicle components 106 to identify in which seating zone 108 the personal device 104 is located. In an example, the vehicle component interface application 118 may determine via BLE triangulation that the personal device 104 is located in one of the seating zones 108 of the vehicle 102.

At operation 706, the personal device 104 determines whether an in-vehicle component 106 is selected for air gesture control. Various approaches may be used for pre-selection of an interior function as a target for gesture control. In an example, a user may press a switch or other control of the in-vehicle component 106 within the seating zone 108 of the user, to activate gesture detection.

As another example, the vehicle component interface application 118 may determine via BLE triangulation that the personal device 104 is being moved towards an in-vehicle component 106 of the seating zone 108 of the user. Or, an icon representing the function may be placed on or near the in-vehicle component 106, and BLE triangulation may be used to establish user intent to interact with the specific in-vehicle component 106 as the user moves his or her personal device 104 towards the icon.

As yet another example, the vehicle component interface application 118 or the gesture detection service 122 may determine that motion of the personal device 104 towards a predefined region of the seating area 108 indicates a request to initiate an air gesture (e.g., up, down to a side, etc.). For instance, pre-defined areas in the seating zone 108 could be assigned to specific functions. For example, reaching up could automatically select control of a lighting in-vehicle component 106, and air gestures performed after selection of the in-vehicle component 106 could be performed to control the lighting in-vehicle component 106. As another example, reaching up diagonally could select a moon-roof in-vehicle component 106, if available. As yet further examples, reaching down could select a seat in-vehicle component 106, reaching to a side window could select control of the window in-vehicle component 106, and reaching towards the center of the vehicle 102 away from the window could select control of the speaker in-vehicle component 106.

At operation 708, the personal device 104 tracks personal device 104 sensor inputs normalized to a reference frame of the vehicle 102. For example, and as explained in detail with respect to the process 300 above, data from the sensors of the personal device 104, such as acceleration sensors 126 and orientation sensors 130 may be adjusted using an orientation matrix accounting for personal device 104 orientation, magnetic North angle θ for the vehicle 102, and $α_{seat}$ for the current seating zone 108 of the personal device 104. The resultant normalized data may be referred to as acceleration data 124. In some examples, at the outset of operation 708 the gesture detection service 122 may provide an indication of the ready status of the gesture detection service 122 via playing a sound through a speaker of the personal device 104, and/or actuating a haptic feedback device of the personal device 104 to communicate to the user that air gestures are ready to be recognized.

At operation 710, the personal device 104 determines whether a valid air gesture is detected. In an example, the gesture detection service 122 compares the acceleration data 124 to the model air gestures 502 in the library 128. If a match is found, control passes to operation 712.

At operation 712, the personal device 104 performs a command associated with the detected gesture. In an example, the in-vehicle component 106 may be a screen in-vehicle component 106 in the seating zone 108 of the user configured to advance to a next image responsive to detection of a right-to-left air gesture performed using the personal device 104, and to move back to a previous image responsive to detection of a left-to-right air gesture performed using the personal device 104. In another example, the in-vehicle component 106 may be a speaker in-vehicle component 106 configured to increase volume responsive to detection of a down-to-up air gesture or decrease volume responsive to detection of an up-to-down air gesture. It should be noted that these are only examples, and different commands may be mapped to different air gestures, and different in-vehicle components 106 may be controlled via air gestures.

At operation 714, the personal device 104 determines whether detection of gestures is concluded. For instance, the vehicle component interface application 118 may receive an indication from the gesture detection service 122 that a gesture indicating closing of the gesture detection mode has been performed. As another example, the vehicle component interface application 118 may determine (or may receive an indication from the gesture detection service 122) that a timeout has expired after which air gestures are determined to be complete. If so, control passes to operation 704. Otherwise, control returns to operation 708 to continue to track for air gestures.

Computing devices described herein, such as the personal devices 104 and in-vehicle components 106, generally include computer-executable instructions, where the instructions may be executable by one or more computing devices such as those listed above. Computer-executable instructions, such as those of the vehicle component interface application 118 and/or gesture detection service 122, may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system, comprising:
a vehicle sensor configured to measure heading angle of a vehicle;
a plurality of seating zones, each including an orientation sensor configured to measure seating angle for the respective seating zone relative to the vehicle; and
a component within one of the seating zones, programmed to:
provide interface information descriptive of commands and associated air gestures oriented to the one seating zone; and
perform one of the commands responsive to a personal device detecting the corresponding air gesture, accounting for the heading angle and seating angle.

2. The system of claim 1, wherein the orientation sensors are configured to indicate the seating angle as an offset from the heading angle.

3. The system of claim 1, wherein the vehicle sensor is configured to indicate the heading angle as an offset from magnetic North.

4. The system of claim 1, wherein the component is a display screen, and one of: the air gesture is a movement from right to left and the command is a move next command, and the air gesture is a movement from left to right and the command is a move previous command.

5. The system of claim 1, wherein the component is a speaker, and one of: the air gesture is a movement from down to up and the command is an increase volume command, and the air gesture is a movement from up to down and the command is a decrease volume command.

6. The system of claim 1, wherein the component is further programmed to receive a user selection to invoke acceptance of the air gestures for the commands.

7. The system of claim 6, wherein the user selection includes one or more of: selecting a control of the component, or determining increasing signal strength from the personal device indicative of approach of the personal device to the component.

8. A method comprising:
adjusting gesture input from a personal device to create acceleration data in a reference frame of a component in a seating zone using orientation of the device, vehicle heading relative to magnetic North, and sensor-measured angle offset of the zone from vehicle heading; and
when the acceleration data matches an air gesture in a library of air gestures, sending a command to the component corresponding to the matching air gesture.

9. The method of claim 8, further comprising determining the orientation angle for the seating zone of the vehicle according to an orientation module embedded in a seat of the seating zone providing data with respect to the orientation angle of the seating zone offset from vehicle heading.

10. The method of claim 8, further comprising receiving, from the component, interface information descriptive of commands and corresponding air gestures for the commands.

11. The method of claim 8, further comprising:
preprocessing the air gestures of the library into clusters, each having a defined centroid;
determining a point for the acceleration data utilizing a Hidden Markov Model (HMM); and
matching the air gesture as being the air gesture of the library with a smallest Cartesian distance between the point and the defined centroid.

12. The method of claim 11, further comprising ensuring that the point is within a radius of the defined centroid to confirm identification of the air gesture.

13. The method of claim 8, further comprising:
retrieving magnetic North from a compass of the vehicle; and
retrieving the orientation angle from an orientation sensor in the seating zone of the vehicle.

14. The method of claim 8, further comprising normalizing the acceleration data to remove gravity effects.

15. The method of claim 8, further comprising, to communicate that air gestures are ready to be recognized, initiating one or more of playing a sound or actuating a haptic feedback device.

16. A device comprising:
- a processor;
- an acceleration sensor;
- an orientation sensor;
- a wireless transceiver; and
- a memory storing a gesture detection service and an application,
- wherein the gesture detection service includes instructions that, when executed by the processor, cause the processor to create acceleration data in a frame of reference defined according to orientation of the device, vehicle heading angle, and orientation angle of a seating zone of the vehicle including the device measured using the orientation sensor, thereby accounting for heading angle, orientation angle, and device orientation, and to detect air gestures performed by occupants of a vehicle according to data from the acceleration sensor and the orientation sensor, and the application includes instructions that, when executed by the processor, cause the processor to receive interface information descriptive of commands and corresponding air gestures for the commands from a vehicle component using the wireless transceiver, utilize the gesture detection service to determine when the gestures are performed, and send one of the commands to the vehicle component using the wireless transceiver responsive to the gesture detection service determining that the corresponding air gesture for the command is performed.

17. The device of claim 16, wherein the gesture detection service is further programmed to create acceleration data in a frame of reference defined according to orientation of the device, vehicle heading angle, and orientation angle of a seating zone of the vehicle including the device, thereby accounting for heading angle, orientation angle, and device orientation.

18. The device of claim 17, wherein the gesture detection service includes instructions that, when executed by the processor, cause the processor to:
- preprocess the air gestures of a library of air gestures into clusters, each having a defined centroid;
- determine a point for the acceleration data utilizing a Hidden Markov Model (HMM); and
- match the air gesture to the air gesture of the library with a smallest Cartesian distance between the point and the defined centroid.

19. The device of claim 18, wherein the gesture detection service includes instructions that, when executed by the processor, cause the processor to ensure that the point is within a radius of the defined centroid to confirm identification of the air gesture.

* * * * *